Sept. 30, 1952   A. N. ANTON   2,612,549
PORTABLE SAFETY AND TROUBLE LIGHT
Filed July 29, 1950
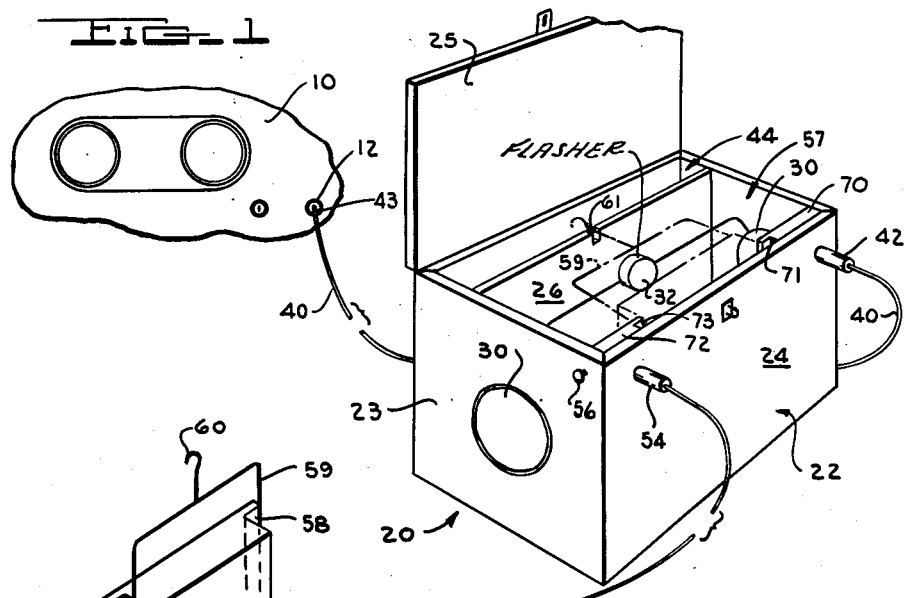
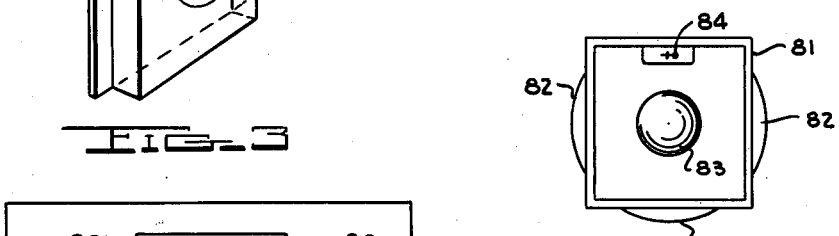
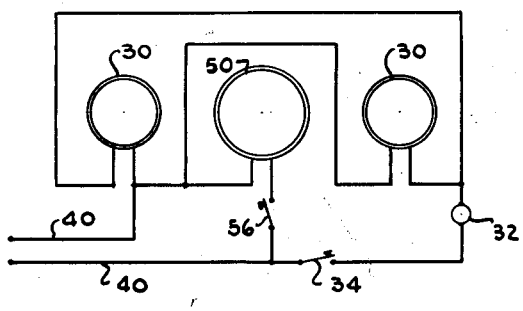
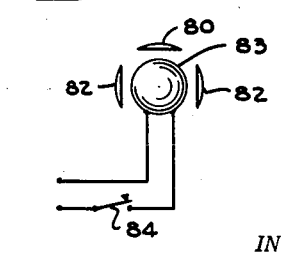
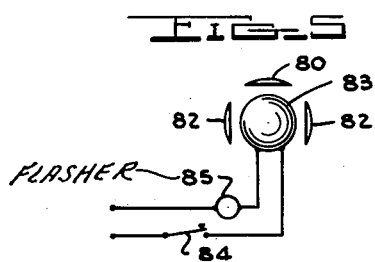
INVENTOR.
ADAM N. ANTON
BY
Arthur M. Smith
ATTORNEY Patented Sept. 30, 1952

2,612,549

UNITED STATES PATENT OFFICE 2,612,549

PORTABLE SAFETY AND TROUBLE LIGHT

Adam N. Anton, Dearborn, Mich.

Application July 29, 1950, Serial No. 176,700

2 Claims. (Cl. 177—329)

The present invention relates generally to a trouble light and more particularly, but not exclusively to a portable safety and trouble light which is especially adapted for use with automobiles and other vehicles in the event of emergencies requiring repair on a highway or other thoroughfare.

In emergencies occurring in connection with automobiles, such as, for example, flat tires or engine failure, particularly at night and on rural highways where vehicles normally travel at relatively high rates of speed, the occupant or other person attempting to repair or service the automobile under such conditions is frequently subjected to considerable danger due to passing vehicles. The person also has substantial difficulty in making such necessary repairs without a special light adapted to be directed on the immediate area or part of the vehicle under repair.

In the event of such emergencies, the automobile must normally be parked while making the necessary repairs relatively near the highway, such as on the road shoulder. Any repairs which must be made on the side of the vehicle adjacent the road is particularly hazardous and increases the possibility of serious bodily injury to the person making such repairs.

At the present time, the conventional automobile is not provided with any special light for warning oncoming vehicles or with a suitable trouble light which may be used in repairing damaged parts thereof. The taillights on present-day automobile models are relatively dim and are completely ineffective in warning motorists traveling at relatively high rates of speed in sufficient time to take any necessary safety precautions. In consequence, each year many persons are killed or injured through accidents which would have been avoided if the parked car were provided with adequate warning or safety lights.

Frequently, motorists carry flashlights or other lighting devices having self-contained batteries or other sources of power which are used alternately to warn oncoming vehicles and to light the area under repair. Such lighting devices have been found unsatisfactory for most purposes, since their power must be quite limited for economic reasons and also for the reason that such a device must be compact and lightweight. In addition, flashlights, for example, utilize dry cell batteries which deteriorate with age and since trouble and safety lights are normally used at rather infrequent intervals, the useful life of such batteries is relatively short.

Moreover, the use of the same light for warning motorists and in aiding in the repair of the vehicle unduly prolongs the time necessary for such repairs and, accordingly, increases the possibility of personal injury or serious accident.

It is, accordingly, an important object of this invention to provide a portable safety and trouble light which is adapted particularly for use with automobiles and other vehicles to light the part or area of the vehicle which requires repair and which also is adapted to simultaneously warn motorists approaching from opposite directions so that the latter may decrease the speed of their vehicles and take any other precautions which are necessary under the conditions.

Another object is to provide a portable safety and trouble light of the above type which is simple to use and manufacture and which is compact, inexpensive, and highly efficient.

Another object is to provide a portable safety and trouble light in accordance with the above objects which is also adapted to utilize sufficient power to adequately light the part or area of the vehicle under repair and also to direct a beam of light in the direction of oncoming vehicles of sufficient intensity to warn the motorists therein in ample time to permit them to slow their vehicles and to take any other necessary precautions.

Another object of this invention is to provide a portable safety and trouble light which is adapted to be connected to the storage battery of an automobile and preferably which is adapted to be connected into the cigarette lighter outlet or socket on the dashboard of the automobile.

Another object of this invention is to provide a safety and trouble light of the above type adapted to be set alongside the vehicle and which is provided with a red light or lens on opposite ends thereof for warning oncoming motorists, the light preferably having a flasher or similar device.

Other objects of this invention will appear in the following description and appended claims, reference being had to the accompanying drawings forming a part of this specification wherein like reference characters designate corresponding parts in the several views.

In the drawings:

Fig. 1 is a fragmentary perspective view of a portable safety and trouble light embodying the features of the present invention and shown electrically connected into the cigarette lighter outlet of the conventional vehicle.

Fig. 2 is a top plan view of a modification of the portable safety and trouble light of the present invention using a single bulb with a plurality of lenses.

Fig. 3 is a schematic wiring diagram of the safety and trouble light shown in Fig. 1.

Figs. 4 and 5 are two separate modifications of schematic wiring diagrams for the safety and trouble light shown in Fig. 2.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The safety and trouble light of the present invention is especially adapted to be carried in a vehicle for use in emergencies, such as flat tires and the like. It is a self-contained unit preferably having a pair of red warning lights mounted in a housing and directed in opposite directions to warn oncoming motorists of the danger imposed by such emergency. The safety and trouble light is also provided with a white floodlight, either mounted within the housing or provided with an extension wire so that the safety device may remain in an obvious position, such as on the side of the vehicle, while the flood light or trouble light is moved about during repair of the vehicle.

The safety and trouble light of the present invention is also provided with electrical leads which are adapted to be connected to the storage battery or into the electrical system of the vehicle so that the device may have the relatively large source of electrical power without additionally increasing the weight, bulk or expense of the device itself. Preferably, the electrical leads are provided with an electrical connector plug which is adapted to be inserted into a cigarette lighter outlet or socket on the dashboard or instrument panel of the vehicle, thus permitting easy and ready attachment of the light in case of an emergency.

The safety and trouble light disclosed herein is so designed that when the safety and trouble light is not in use, it may be compactly carried within a box or housing and the various lights securely held therein so as to prevent damage due to vibration, jolts, and the like, during operation of the vehicle.

With reference to the drawings, and with reference particularly to Fig. 1 thereof, the portable safety and trouble light 20 is shown comprising a housing 22 having mounted in the ends thereof a pair of safety lights 30, preferably having a red lens or a red bulb therein. The safety lights are connected through a flasher unit 32 or similar device and a switch 34 (see Fig. 3) to a terminal (not shown). An extension wire 40 has a connector plug 42 secured to the terminal and also a connector plug 43 which is adapted to be inserted into a cigarette lighter socket or outlet 12 on the vehicle dashboard, or instrument panel 10. The safety and trouble light also comprises a trouble light 50 connected directly to the source of electrical power (see Fig. 3) by means of an extension wire 52, a socket connector 54, and a terminal provided within the housing (not shown). A switch 56 is provided in this circuit for controlling the operation of the trouble light 50.

As shown in Fig. 1, the housing 22 is formed of any suitable material and provided with a bottom (not shown), sidewalls 23 and 24 and a hinged cover 25. The housing is also provided with a transverse wall 26 forming a compartment 44 for retaining the extension wire or cord 40 and also forming the compartment 57 for receiving the trouble light 50 and extension wire 52 when the safety and trouble light 20 is not in use.

A pair of guides 70 and 72 are secured within the compartment 57 of the housing 22 and are adapted to slidably receive the trouble light 50. As shown particularly in Fig. 1, the guides 70 and 72 are provided with complemental guide slots 71 and 73, respectively, which are adapted to receive extensions 58 on the trouble light 50 when the latter is not in use.

The trouble light 50 is provided with a wire handle 59 for carrying the light during its use and has a hook 60 which may be used to hang the light adjacent the part of the vehicle under repair.

When the trouble light 50 is placed in the compartment 57 as described above, the handle 59 is swung to a substantially horizontal position, as shown in broken lines in Fig. 1, and the hook 60 is disposed in a recess 61 provided in the upper edge of the transverse wall 26.

A modification of the invention is illustrated in Fig. 2 of the drawing in which a white trouble light lens 80 is mounted in the front wall of the housing 81 in addition to a pair of red lenses 83 mounted in the ends thereof. A single bulb 83 is provided within the housing 81 for use as a common source of light for all of the lenses and a single switch 84 is mounted within the housing to control the operation thereof.

In this modification, the light may burn continuously when the switch 84 is closed, thus giving a steady light through the trouble light as well as through the red warning lenses. A suitable wiring diagram for such an arrangement is schematically illustrated in Fig. 4. However, if desired, a flasher 85 may also be provided in the circuit as shown in the schematic wiring diagram of Fig. 5 which will provide a flashing light for each of the lenses.

While the safety and trouble light disclosed herein is preferably adapted to be plugged into a cigarette lighter outlet, the cord 40 of the device may be provided with a suitable clamping mechanism for securing the same directly to the terminal of the automobile storage battery. Also, the cord 40 may be provided with a suitable connector for plugging into any other electrical outlet on the automobile, such, for example, as light sockets or the like. However, the modification disclosed using the cigarette lighter outlet is preferred due to the convenience of its location, the ease of making the connection, and the relatively large amperage which the connection is normally designed to carry.

As is believed apparent from the foregoing, the present invention discloses a safety and trouble light which is particularly adapted for use in connection with an automobile in the event of flat tires or the like necessitating repair on a highway or other thoroughfare at night. It should be clear, however, that the trouble light may be also used independently of the safety light in camps, at picnics, at cottages, or the like.

The light disclosed herein is simple in use and manufacture, compact, lightweight, inexpensive and highly efficient. It is adapted for use with a storage battery of an automobile, such that the device may have available a sufficient supply of power so that it may fully and adequately light the part of the automobile under investigation or repair, and so that it will provide an amply intense red light in opposite directions to warn oncoming motorists, thereby to permit the motorist to take any necessary precautions which may be desirable under the particular circumstances.

To further simplify the use of the device, the light of the present invention is adapted for connection into the cigarette lighter outlet of the vehicle which is normally located in a convenient place and which is provided with electrical connections capable of carrying a relatively large amperage.

Having thus described my invention, I claim:

1. A safety and trouble light adapted to be used for an emergency light and comprising a housing having end walls, sidewalls, a bottom and a hinged top cover and also having a transverse wall forming a plurality of compartments therein, a red warning light mounted in each of the end walls of said housing and electrical circuit within said housing for said warning lights and including a flasher, a trouble light adapted to be moved to a position remote from said housing and provided with an extension wire, an electrical circuit for said trouble light carried by said housing, and extension wire for electrically connecting said circuits to an external source of electrical power, said extension wires being detachable from said circuit when said light is not in use, one of said compartments being adapted to receive the extension wire of said trouble light and having a pair of guides therein having complementary slots for slidably receiving said trouble light, said trouble light having a wire handle pivotally connected thereto and provided with a hook portion, said transverse wall being provided with a slot in the upper edge thereof for receiving said hook when said trouble light is in assembled position within said housing.

2. A safety and trouble light in accordance with claim 1 and being further characterized in that the extension wire for electrically connecting the circuits to an external source of electrical power is provided with an electrical plug adapted to be connected into a cigarette lighter outlet of a vehicle.

ADAM N. ANTON.

REFERENCES CITED

The following references are of record in the file of this patent:

UNITED STATES PATENTS

| Number | Name | Date |
|---|---|---|
| 2,165,562 | Mack et al. | July 11, 1939 |
| 2,230,458 | Hummert | Feb. 4, 1941 |
| 2,290,419 | Dunn | July 21, 1942 |
| 2,312,649 | Kelly | Mar. 2, 1943 |
| 2,447,403 | Forbes | Aug. 17, 1948 |
| 2,481,444 | Pierrez | Sept. 6, 1949 |
| 2,491,094 | Du Frane | Dec. 13, 1949 |
| 2,496,618 | Cox et al. | Feb. 7, 1950 |
| 2,511,893 | Alden | June 20, 1950 |
| 2,517,119 | Le Duc | Aug. 1, 1950 |
| 2,543,093 | Braunsdorff | Feb. 27, 1951 |